(12) United States Patent
Troncoso et al.

(10) Patent No.: US 9,370,956 B2
(45) Date of Patent: Jun. 21, 2016

(54) HIGH RESOLUTION LASER LABELING OF MICROSCOPIC GLASS SLIDES AND HISTOLOGICAL SECTIONS

(71) Applicant: THE JOHNS HOPKINS UNIVERSITY, Baltimore, MD (US)

(72) Inventors: Juan C. Troncoso, Ellicott City, MD (US); William E. Torruellas, Baltimore, MD (US); David M. Brown, Baltimore, MD (US); Andrea M. Brown, Baltimore, MD (US)

(*) Notice: Subject to any disclaimer, the term of this patent is extended or adjusted under 35 U.S.C. 154(b) by 0 days.

(21) Appl. No.: 14/699,064

(22) Filed: Apr. 29, 2015

(65) Prior Publication Data
US 2015/0314625 A1 Nov. 5, 2015

Related U.S. Application Data

(60) Provisional application No. 61/987,850, filed on May 2, 2014.

(51) Int. Cl.
*B41M 5/26* (2006.01)
*G02B 21/34* (2006.01)

(52) U.S. Cl.
CPC ............... *B41M 5/262* (2013.01); *G02B 21/34* (2013.01)

(58) Field of Classification Search
CPC ............................... B41M 5/262; G02B 21/34
See application file for complete search history.

(56) References Cited

U.S. PATENT DOCUMENTS

| | | | | |
|---|---|---|---|---|
| 6,501,499 B2* | 12/2002 | Hayashi | ............. | B23K 26/0057 347/224 |
| 2009/0291195 A1* | 11/2009 | Angros | ................... | B01L 3/545 427/2.11 |
| 2014/0205083 A1* | 7/2014 | Pryakhin | ............... | H04L 9/0816 380/28 |

OTHER PUBLICATIONS

Andreeta, M. et al. Bidimensional codes recorded on an oxide glass surface using a continuous wave CO2 laser. J of Micromechanics and Microengineering, 2011;21(2): 1-5.
Stasiuk, L. et al. Characterization of diatom-derived lipids and chlorophyll within Holocene Iaminites, Saanich Inlet, British Columbia, using conventional and laser scanning fluorescence microscopy. Organic Geochemistry, 2001;32 (12): 1417-1428.

* cited by examiner

*Primary Examiner* — Sarah Al Hashimi
(74) *Attorney, Agent, or Firm* — Johns Hopkins Technology Ventures

(57) ABSTRACT

The present invention is directed to a device and a laser, eye-safe method for laser marking slides for use in conjunction with a light microscope. The device is an attachment for a light microscope that allows the operator to make marks on preparations of biological tissues or other materials placed on a glass slide or between a glass slide and a cover slip. The marks can be used to indicate or highlight a microscopic structure or feature of interest. The marking on the slide is performed as the specimen is examined, without having to remove it from the microscope stage. In this way the invention has application in a biomedical or pathology laboratory for diagnostic, research, archival, and teaching or training purposes.

10 Claims, 13 Drawing Sheets

22 Microscope light source
24 Laser source
26 Prism
28 Condenser
30 Dichroic mirror
31 Glass slide

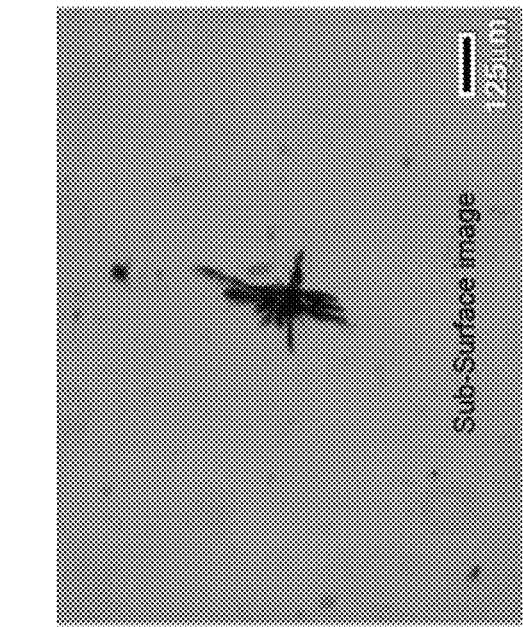
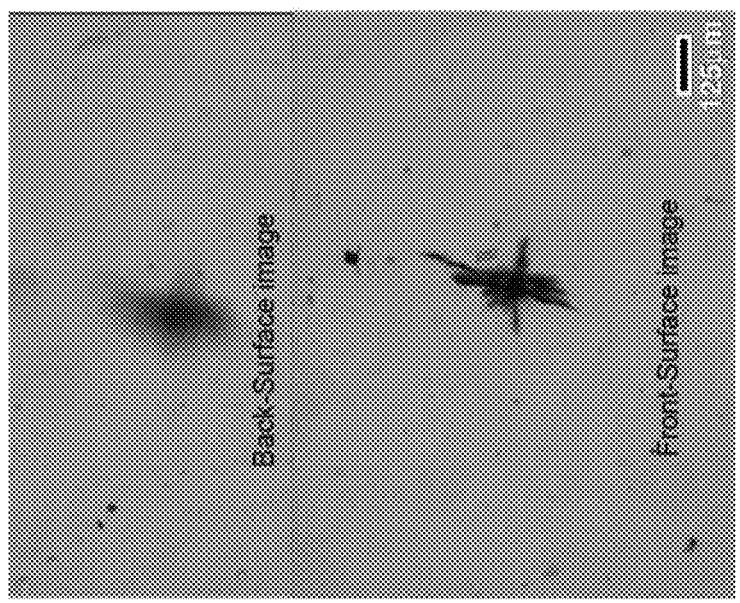
FIG. 7C
FIG. 7A
FIG. 7B

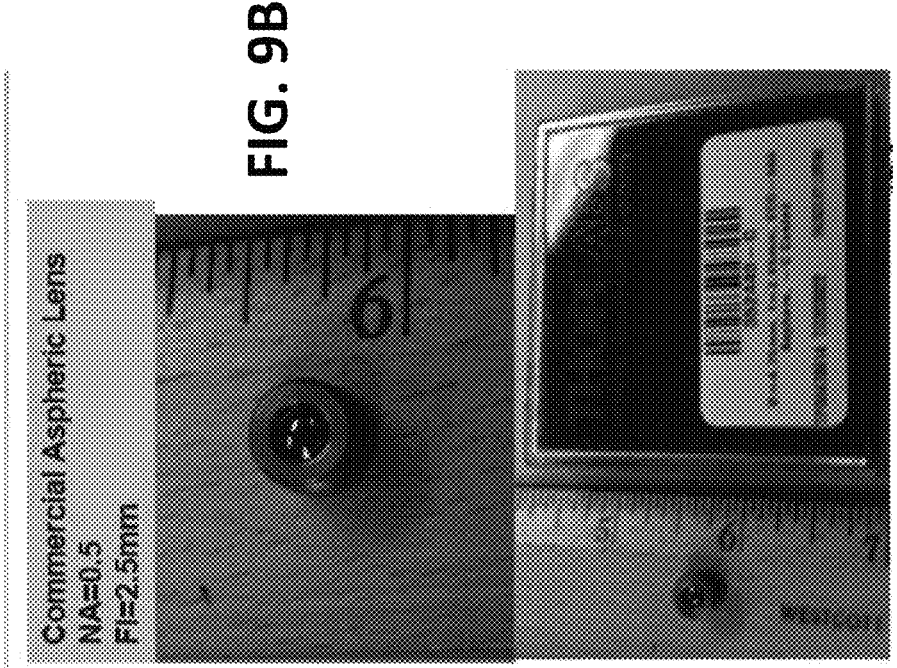
FIG. 9B
FIG. 9C
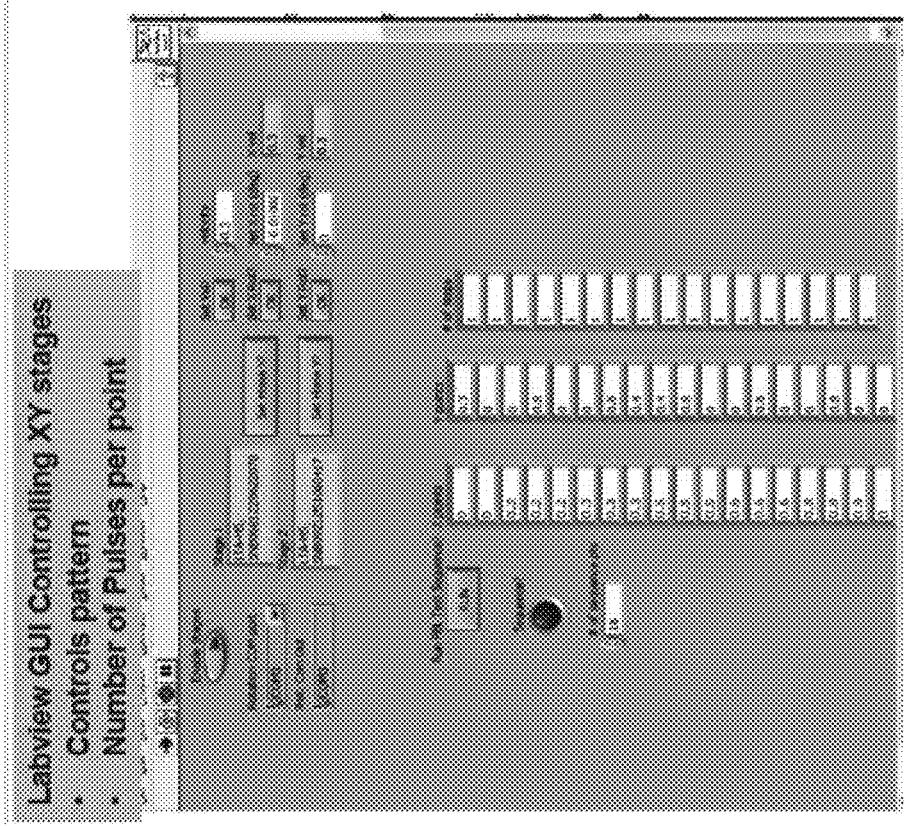
FIG. 9A

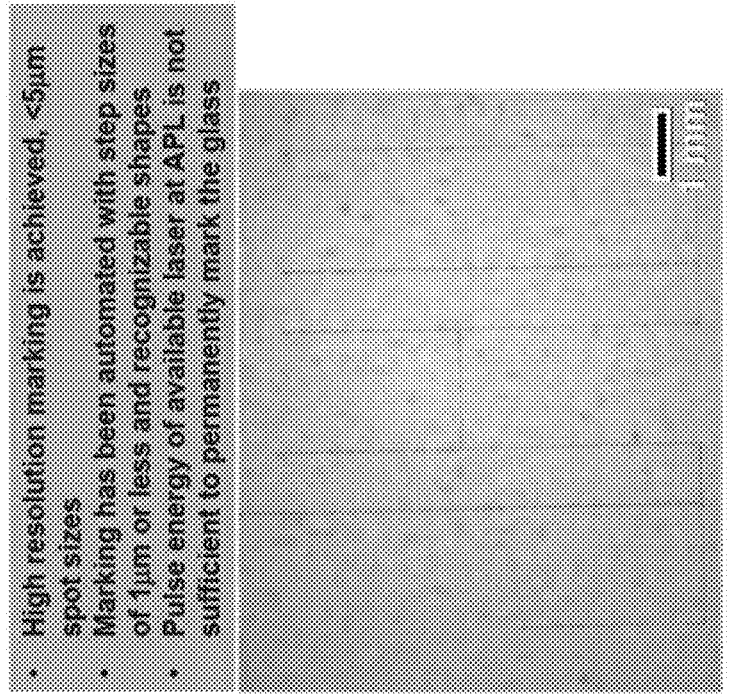
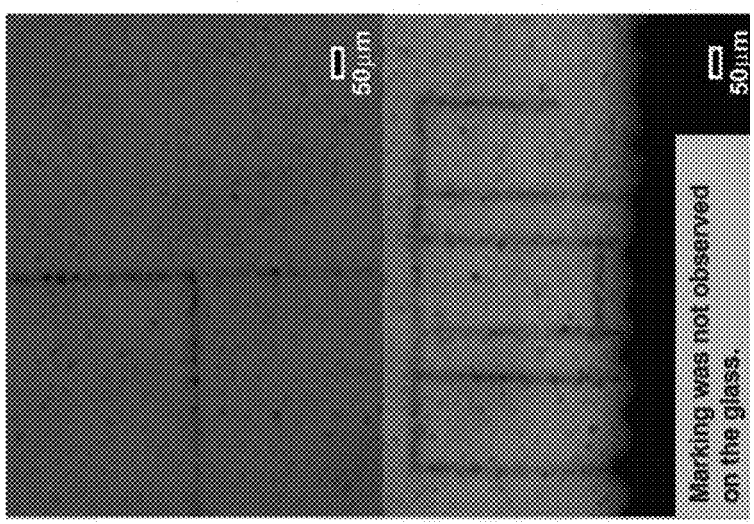
FIG. 10A
FIG. 10B
FIG. 10C

HIGH RESOLUTION LASER LABELING OF MICROSCOPIC GLASS SLIDES AND HISTOLOGICAL SECTIONS

CROSS REFERENCE TO RELATED APPLICATIONS

This application claims the benefit of U.S. Provisional Patent Application No. 61/987,850 filed May 2, 2014, which is incorporated by reference herein, in its entirety.

FIELD OF THE INVENTION

The present invention relates generally to laboratory equipment. More particularly, the present invention relates to a device and method for marking laboratory microscopic glass slides.

BACKGROUND OF THE INVENTION

It is common laboratory practice to prepare glass slides for viewing under a light microscope. These slides are generally preparations of tissues or other materials placed on a glass slide or between a glass slide and a cover slip. It is often necessary to label these slides in order to point out areas of note, categorize, mark as viewed, etc. The current method for labeling histological slides during microscopic examination is to rotate the objective a few degrees and manually mark the slide with a sharp ink pen. This method is cumbersome, inefficient, and often inaccurate.

Accordingly, there is a need in the art for a method and apparatus for marking slides easily, quickly and accurately.

SUMMARY OF THE INVENTION

The foregoing needs are met by the present invention which provides a method for:

A system for marking microscopic slides that includes a light microscope for observing the slide, having a light source, a sample stage, and a condenser, objective, and occular lenses. The system also includes a laser source configured to generate a laser beam for marking the slides, a prism for directing the laser beam, and a condenser through which the laser light travels.

In accordance with an aspect of the present invention, a device for marking microscope slides configured to be used with a light microscope includes a laser source configured to generate a laser beam for marking the slides. The device can also include a prism for directing the laser beam, and a condenser through which the laser light travels.

In accordance with another aspect of the present invention, the components are oriented such that the laser beam passes through the prism, the condenser, and a dichrotic mirror. The laser source is off when the light microscope is on. The laser light source is turned on and off automatically, automatically with a manual override, or manually. The laser source is disposed within a laser box. The laser box includes a lid that seals hermetically. The laser generates a laser beam of 30-400 µJ/pulse. The laser source is configured to be operated at 10 pulses/sec.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 7A-7C illustrate an exemplary result of an experiment performed with the first exemplary embodiment of the invention described above.

FIG. 9A illustrates a labview GUI controlling the X-Y stage. The GUI controls the pattern of marking and the number of pulses per point. FIG. 9B illustrates an aspheric lens according to the embodiment of the invention, and FIG. 9C illustrates another view of the aspheric lens.

FIGS. 10A-10C illustrate exemplary results according to the second exemplary embodiment of the present invention.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains, having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to a device and method for laser marking slides for use in conjunction with a light microscope. The device is an attachment for a light microscope that allows the operator to make marks on preparations of biological tissues or other materials placed on a glass slide or between a glass slide and a cover slip. The marks can be used to indicate or highlight a microscopic structure or feature of interest. The marking on the slide is performed as the specimen is examined, without having to remove it from the microscope stage. In this way the invention has application in a biomedical or pathology laboratory for diagnostic, research, archival, and teaching or training purposes.

Figure 1:
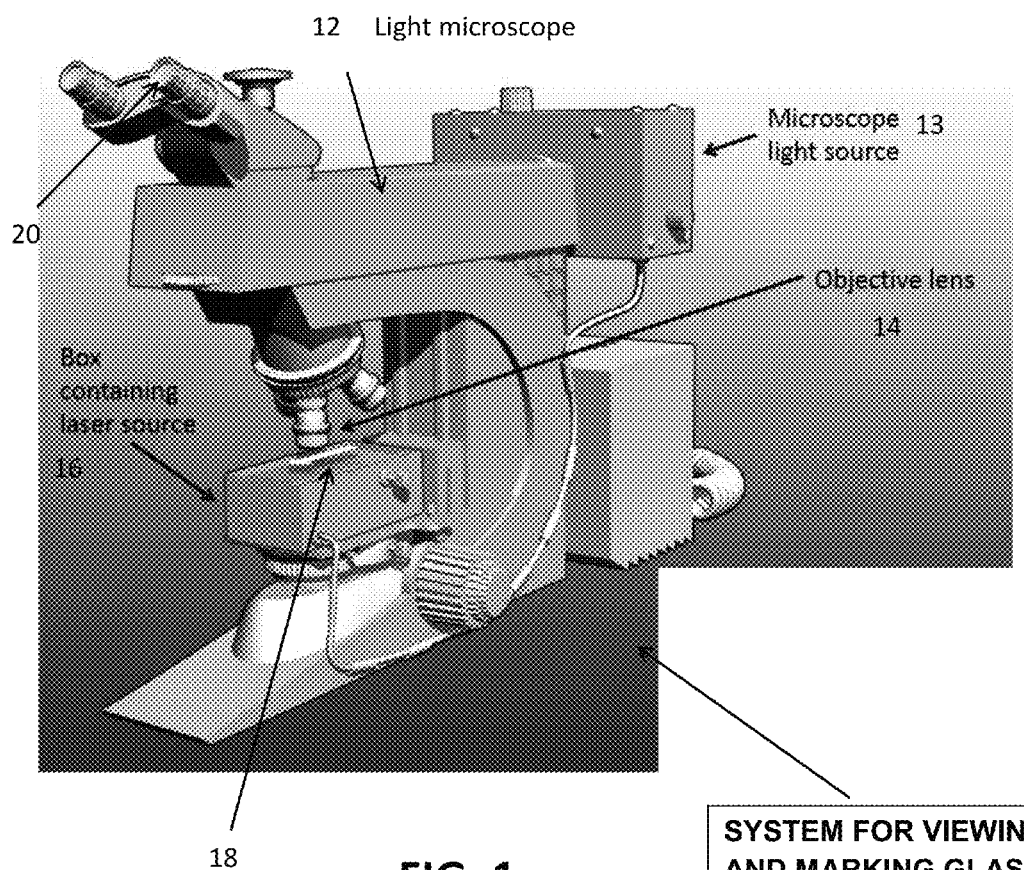
FIG. 1 illustrates a perspective view of a system for viewing and marking glass slides according to an embodiment of the present invention.

FIG. 1 illustrates a perspective view of a system for viewing and marking glass slides according to an embodiment of the present invention. FIG. 1 illustrates a system for viewing and marking glass slides 10 including a light microscope 12. The light microscope 12 includes a microscope light source 13 and an objective lens 14. The system 10 also includes a laser source device 16 disposed beneath the objective lens 14. A glass slide (not shown) with mounted sample can be placed under the objective lens 14 on the microscope stage 18. The microscope stage 18 is on top of the laser source device 16, such that the laser source device 16 is used to mark the slide while the slide is still on the microscope stage 18. Ocular lenses 20 are used to observe the slide on the microscope stage 18.

Figure 2:
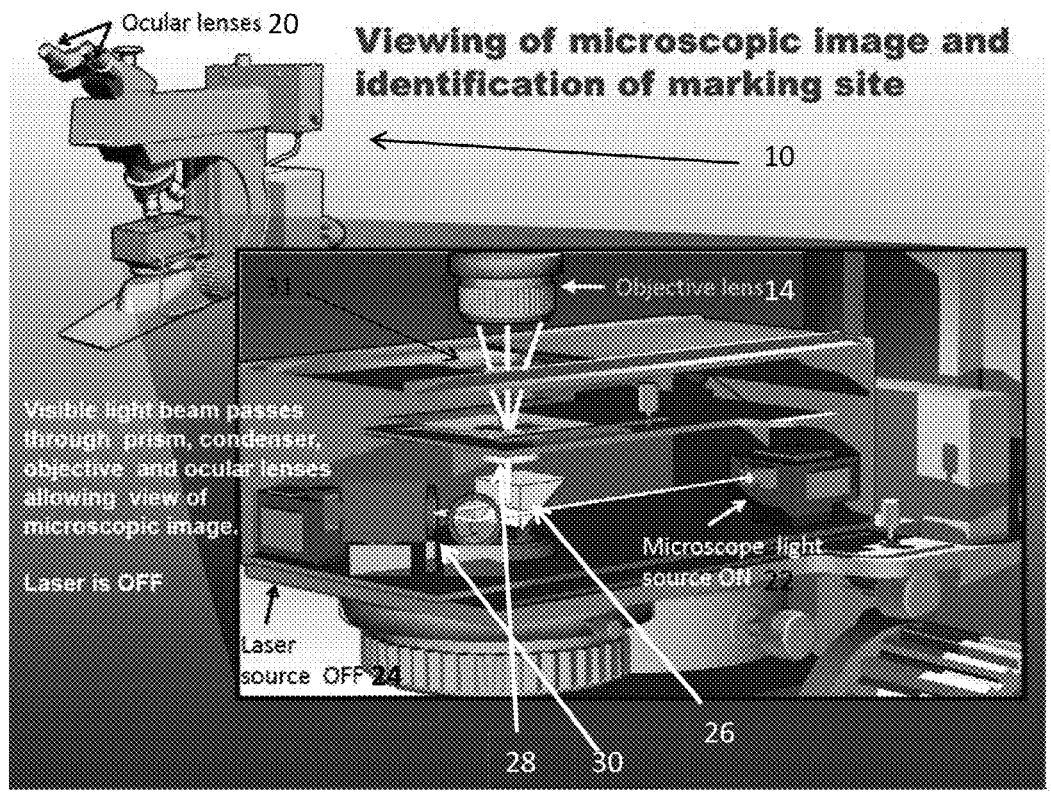
FIG. 2 illustrates a sectional view of the objective lens, laser source device, and microscope stage, according to an embodiment of the present invention.

FIG. 2 illustrates a sectional view of the objective lens, laser source device, and microscope stage, according to an embodiment of the present invention. As illustrated in FIG. 2, the system for viewing and marking glass slides 10 includes an objective lens 14, ocular lenses 20, a microscope light source 22 for illuminating the slide, and a laser source 24 for marking the slide. As illustrated in FIG. 2, the microscope light source 22 is on and a visible light beam passes through a prism, 26, a condenser 28, and a dichroic mirror 30. Further, as illustrated in FIG. 2, the laser source 24 is off, when the microscope light source 22 is on. The laser light source 24 can be turned on and off automatically based on whether or not the microscope light source 22 is on, or it can be controlled manually.

Figure 3:
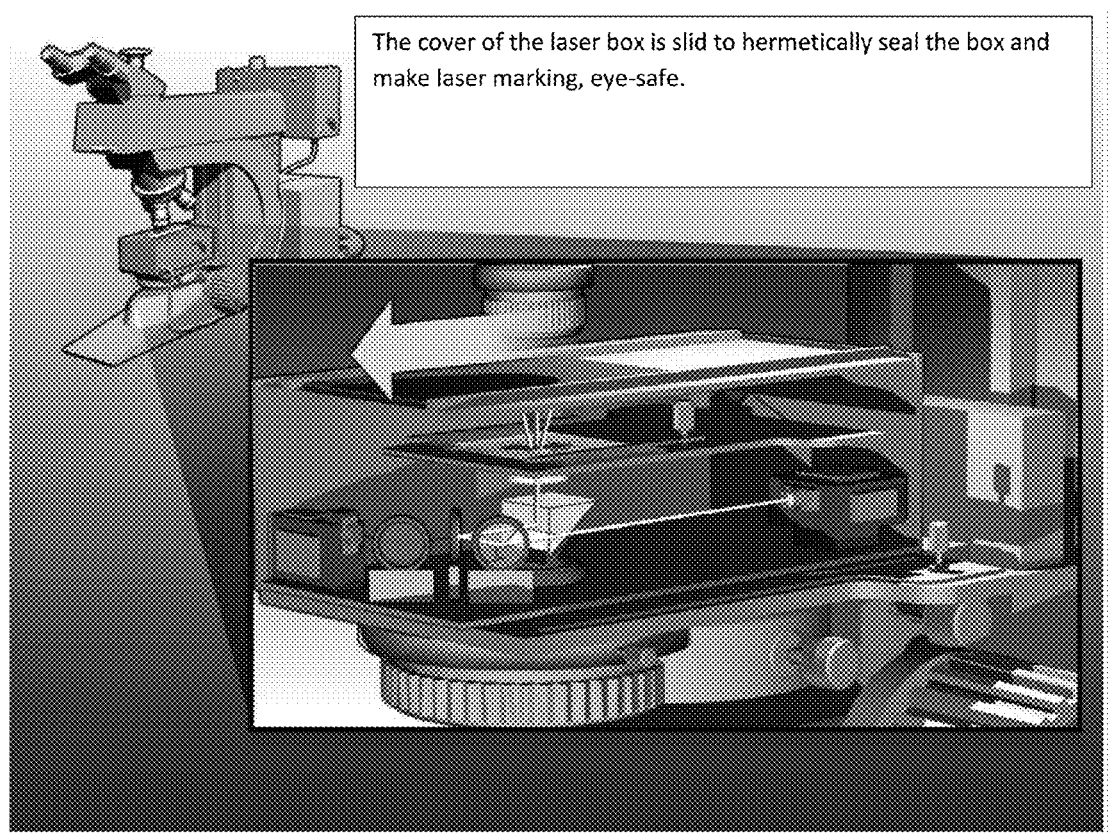
FIG. 3 illustrates a sectional view of the objective lens, laser source device, and microscope stage, according to an embodiment of the present invention.

FIG. 3 illustrates a sectional view of the objective lens, laser source device, and microscope stage, according to an embodiment of the present invention. As illustrated in FIG. 3, once an area is identified for marking, while the microscope light source is illuminated, the cover of the laser box hermetically seals the box making the laser marking eye-safe. This protects the user's eyes from the laser light source before it is engaged for marking the slide. The objective lens can be moved automatically or manually before the laser light source is engaged.

Figure 4:
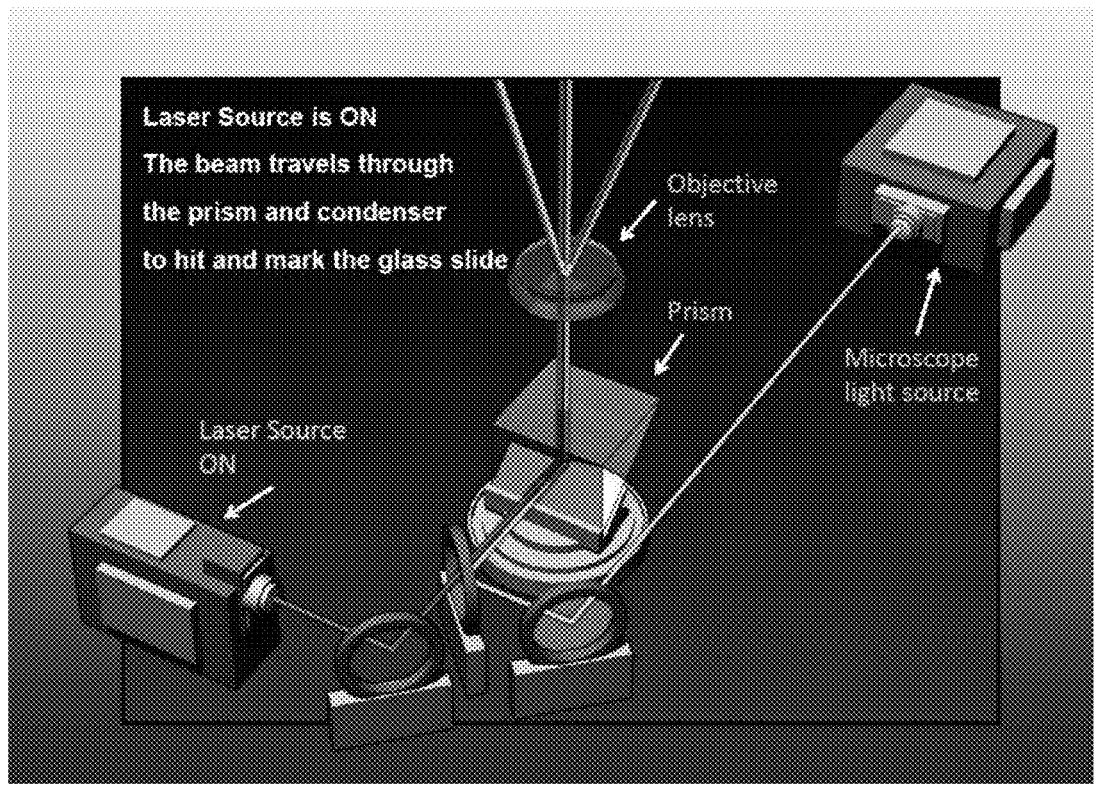
FIG. 4 illustrates the laser light source according to an embodiment of the present invention.

FIG. 4 illustrates the laser light source according to an embodiment of the present invention. As illustrated in FIG. 4, the laser light source is engaged and the laser beam travels through prism and condenser in order to hit and mark the glass slide. The microscope light source can also be on at this time, as illustrated in FIG. 4. As noted with respect to FIG. 3 the light beam generated by the microscope light source travels through the dichroic mirror, the prism, and condenser.

EXAMPLE

Exemplary implementation of the present invention are described herein, in order to further illustrate the present invention. The exemplary implementations are included merely as an example and are not meant to be considered limiting. Any implementation of the present invention on any suitable subject known to or conceivable by one of skill in the art could also be used, and is considered within the scope of this application. The first exemplary embodiment includes a commercial flash lamp pumped pulsed Q-switch laser (400 µJ/pulse; 10 ns; 1064 nm; 10 PPS) with a commercial aspheric 4 mm diameter, 3 mm focal length lens (NA ~0.6). A second exemplary embodiment includes using a micro-laser producing 1 ns pulses at up to 4 µJ/pulse at 20 KPPS, 700 ps, and 1064 nm with the same aspheric lens as the first exemplary embodiment. Bulk fused silica single pulse damage is assumed at 1 kJ/cm$^2$ for 10 ns pulses. Diffraction limited focal spot diameter is 1.5 µm and depth of focus is 2 µm. The minimum energy required to achieve damage is in reasonable agreement with the preliminary results and is expected to be:

10 µm spot size diameter: 400 µJ

5 µm spot sized diameter: 100 µJ

2 µm spot sized diameter: 15 µJ

A motorized X-Y translation stage has better than 1 µm resolution. Laser fluence, 0.5 kJ/cm$^2$, seems to be below the damage of glass at 1 KJ/cm$^2$. Fluence is sufficient to damage the white region of the microscope. The minimum pulse energy required to achieve damage exceeds the 4 µJ/pulse from the laser, commercial lasers are also available.

Figure 5:
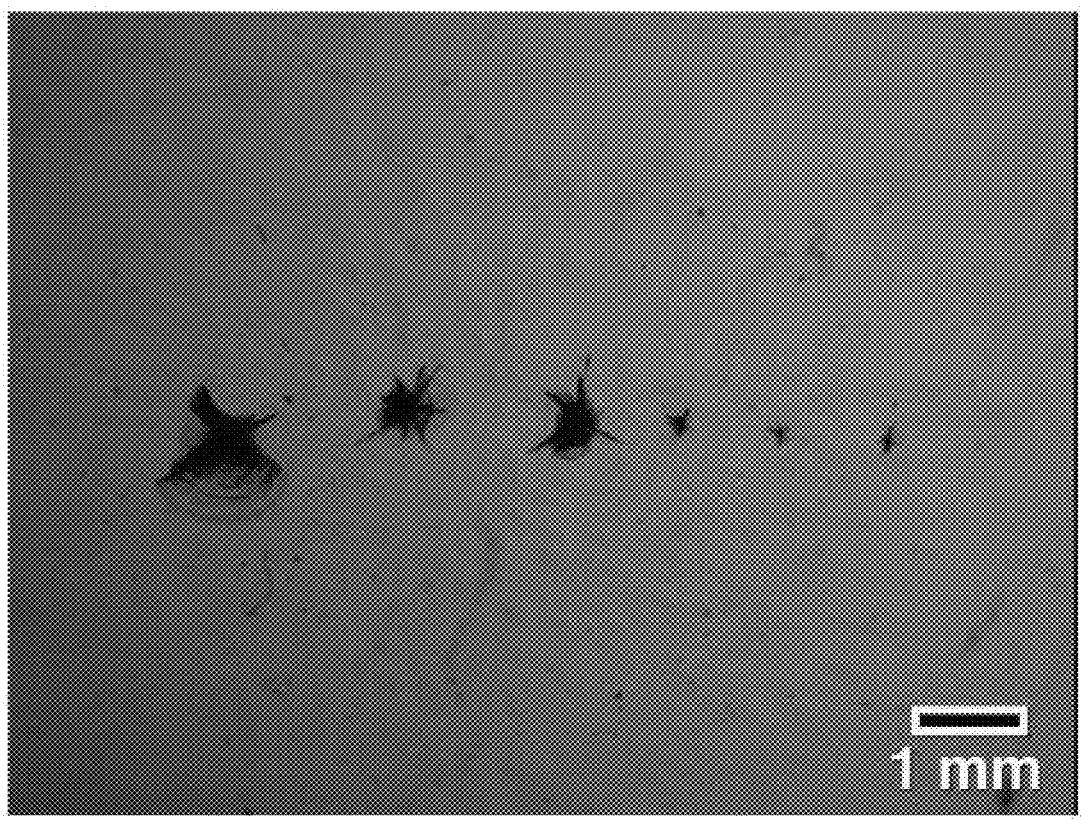
FIG. 5 illustrates an exemplary result of an experiment performed with an exemplary embodiment of the invention.

FIG. 5 illustrates an exemplary result of an experiment performed with the first exemplary embodiment of the invention described above. As illustrated in FIG. 4 the sample was exposed to multiple pulses of varying energies: 30-400 µJ/pulse. The laser was operated at 10 PPS. By varying the number of pulses delivered, the size of the damage spot was visibly changed. With less than 30 µJ/Pulse, visible damage is observed. The damage threshold scales as the square route of the pulse duration. For sub 1 ns pulses, a damage energy of less than 10 µJ/pulse is expected.

Figure 6:
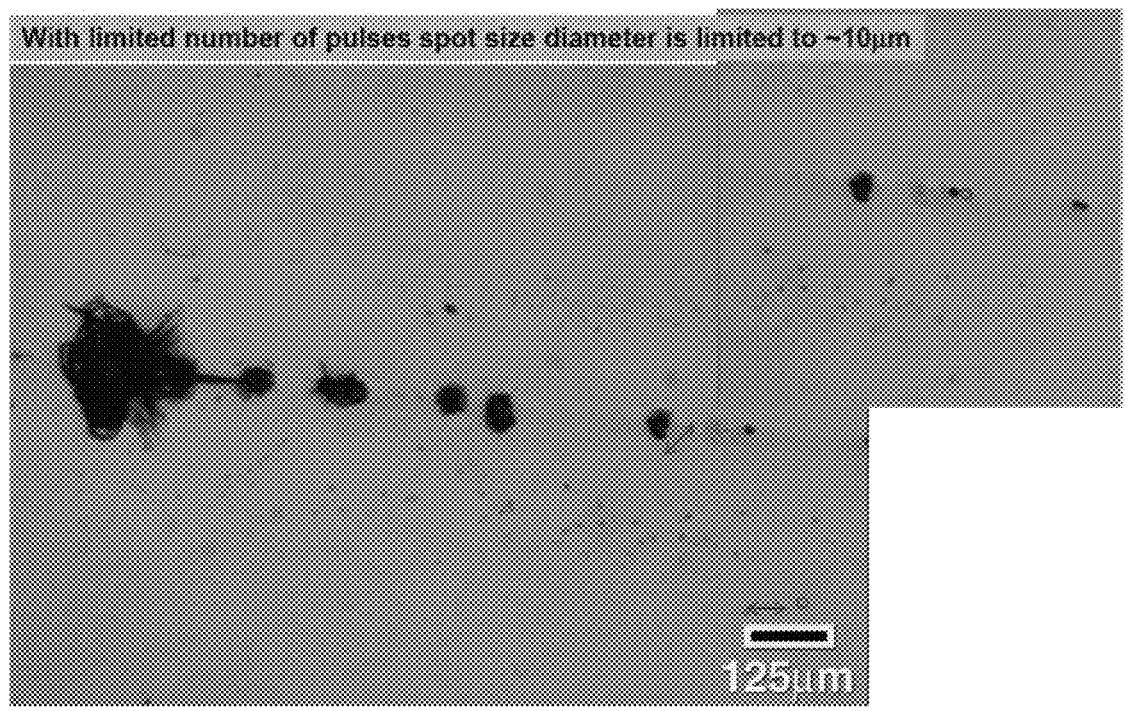
FIG. 6 illustrates an exemplary result of an experiment performed with the first exemplary embodiment of the invention described above. A reduced spot size should allow for small pulse energy: $E_p > 30$ µJ/pulse. With a limited number of pulses, spot size diameter is limited to ~10 µm.

FIG. 6 illustrates an exemplary result of an experiment performed with the first exemplary embodiment of the invention described above. A reduced spot size should allow for small pulse energy: $E_p$>30 µJ/pulse. With a limited number of pulses, spot size diameter is limited to ~10 µm.

FIGS. 7A-7C illustrate an exemplary result of an experiment performed with the first exemplary embodiment of the invention described above. As illustrated in FIGS. 7A-7C laser-marking is visible through the entire depth of the microscope slide. FIG. 7A illustrates a back surface image of the slide. FIG. 7B illustrates a front surface image of the slide, and FIG. 7C illustrates a sub-surface image of the slide from FIG. 7A.

Figure 8A:
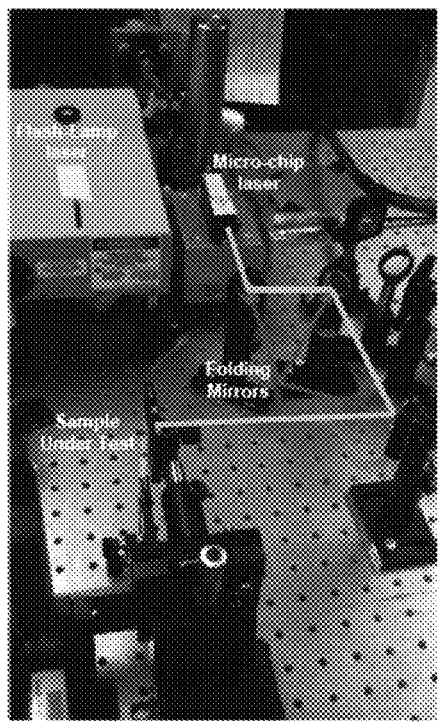
FIGS. 8A and 8B illustrate the experimental setup for the second exemplary embodiment.
Figure 8B:
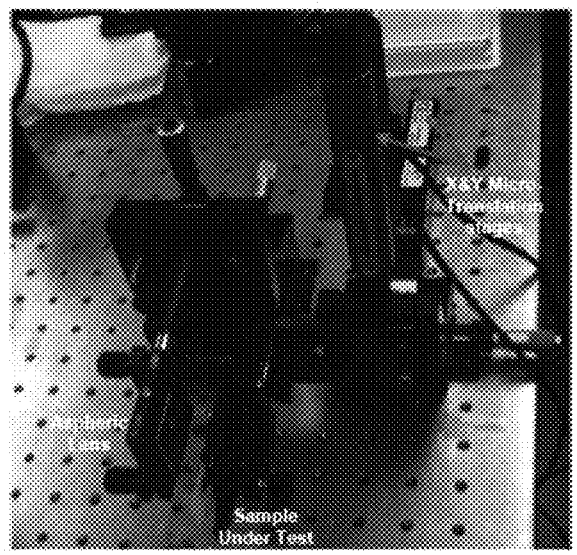

FIGS. 8A and 8B illustrate the experimental setup for the second exemplary embodiment. As illustrated in FIG. 8A folding mirrors are used to direct the laser to the sample under test. As illustrated in FIG. 8B an X-Y micro-translation stage is also used in this embodiment.

FIG. 9A illustrates a labview GUI controlling the X-Y stage. The GUI controls the pattern of marking and the number of pulses per point. FIG. 9B illustrates an aspheric lens according to the embodiment of the invention, and FIG. 9C illustrates another view of the aspheric lens.

Figure 11:
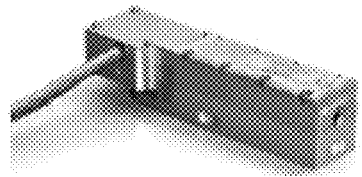
FIG. 11 illustrates potential commercial microchip lasers that could be used and that would have sufficient energy to permanently mark the glass.

FIGS. 10A-10C illustrate exemplary results according to the second exemplary embodiment of the present invention. In FIG. 10B, marking is not observed on the microscope glass. High resolution marking is achieved with <5 µm spot sizes. The marking has been automated with step sizes of 1 µm or less and recognizable shapes. The pulse energy of the available laser is not sufficient to permanently mark the glass in this case. FIG. 11 illustrates potential commercial microchip lasers that could be used and that would have sufficient energy to permanently mark the glass.

Figure 12A:
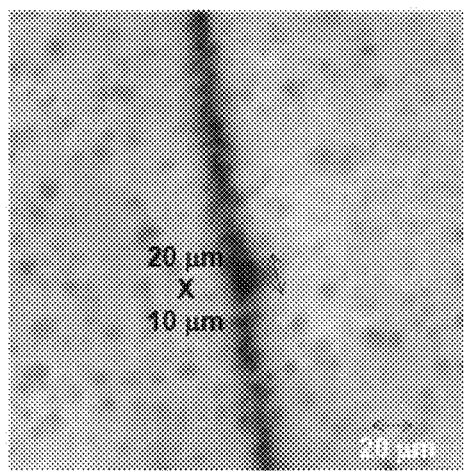
FIGS. 12A and 12B illustrate high resolution marking.
Figure 12B:
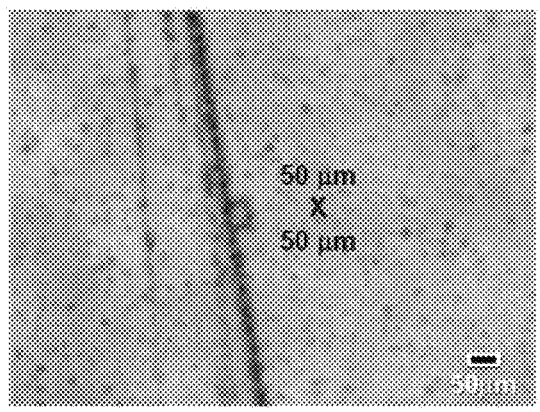

FIGS. 12A and 12B illustrate high resolution marking FIG. 12A illustrates 20 µm×10 µm marking, and FIG. 12B illustrates 50 µm×50 µm markings. High resolution marking was demonstrated with the micro-chip laser on the white painted portion of microscope slides. The pulse energy was 4 µJ/pulse, and the pulse duration is 700 ps with a 20 kpps repetition rate. Marking with mm resolution is possible. The experiments included herein are only limited by a grain size of the painted portion of the microscope. Marking with a 10 µm resolution is demonstrated.

Figure 13:
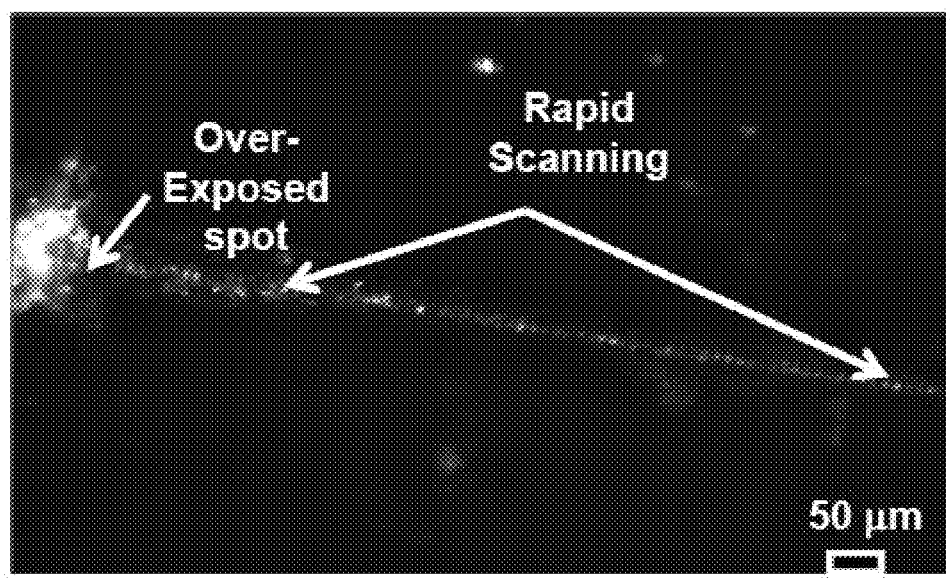
FIG. 13 illustrates an experimental result on a sample with a typical thin film.

FIG. 13 illustrates an experimental result on a sample with a typical thin film. Marking on the sample itself is demonstrated in FIG. 13. Exposure time needs additional calibration, because overexposure can result in damage to the glass slide. Two representative samples were exposed to both lasers used in the exemplary experiments described herein. The sample consisted of microscope slides covered by a dye thin film used to fix biological specimens. The exposed films did not have biological specimens. No evidence of marking was observed with the micro-chip laser on either thin films or microscope slides. Marking was observed with the flash-lamp laser at the minimum energy of 150 µJ/pulse. Rapid scanning was needed to avoid damaging/marking the glass slides.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An eye safe system for in-situ permanent marking of microscope slides comprising:
    a light microscope for observing the slide, having a light source, a sample stage, and condenser, objective, and occular lenses;
    a laser source configured to generate a laser beam for marking the slides;
    a prism for directing the laser beam;
    a condenser through which the laser light travels; and
    a mechanism for rendering the marking system eye-safe to the operator.

2. The system of claim 1 further comprising the components being oriented such that the laser beam passes through the prism, the condenser, and the dichrotic mirror.

3. The system of claim 1 further comprising the laser source being configured to be off when the light microscope is configured to be on.

4. The system of claim 1 further comprising the laser light source being configured to be turned on and off automatically.

5. The system of claim 1 further comprising the laser light source being configured to be turned on and off automatically with a manual override.

6. The system of claim 1 further comprising the laser light source being configured to be turned on and off manually.

7. The system of claim 1 further comprising the laser source being disposed within a laser box.

8. The system of claim 1 further comprising the laser box comprising a lid that seals hermetically.

9. The system of claim 1 further comprising the laser generating a laser beam of 30-400 µJ/pulse.

10. The system of claim 1 wherein the laser source is configured to be operated at 10 pulses/sec.

* * * * *